(12) United States Patent
Pflug et al.

(10) Patent No.: US 7,942,769 B2
(45) Date of Patent: May 17, 2011

(54) OIL SUPPLY SYSTEM FOR SUPPLYING OIL TO SLIDE RAILS AND GUIDE RAILS

(75) Inventors: Rainer Pflug, Heilsbronn (DE); Christoph Schroeder, Herzogenaurach (DE); Martin Assel, Burgbernheim (DE)

(73) Assignee: Schaeffler KG, Herzogenaurach (DE)

( * ) Notice: Subject to any disclaimer, the term of this patent is extended or adjusted under 35 U.S.C. 154(b) by 993 days.

(21) Appl. No.: 11/721,080

(22) PCT Filed: Nov. 10, 2005

(86) PCT No.: PCT/EP2005/012024
§ 371 (c)(1),
(2), (4) Date: Jun. 27, 2007

(87) PCT Pub. No.: WO2006/134136
PCT Pub. Date: Dec. 21, 2006

(65) Prior Publication Data
US 2009/0325748 A1    Dec. 31, 2009

(30) Foreign Application Priority Data
Dec. 8, 2004   (DE) .................. 10 2004 058 948

(51) Int. Cl.
*F16H 57/04*   (2010.01)
*F16H 7/08*    (2006.01)
(52) U.S. Cl. .......................... 474/91; 474/111
(58) Field of Classification Search .............. 474/91, 474/111, 140
See application file for complete search history.

(56) References Cited

U.S. PATENT DOCUMENTS

| | | | | |
|---|---|---|---|---|
| 5,222,917 A | * | 6/1993 | Shimaya et al. | 474/101 |
| 5,318,482 A | * | 6/1994 | Sato et al. | 474/111 |
| 5,647,811 A | * | 7/1997 | Mott | 474/91 |
| 5,779,582 A | | 7/1998 | Mott et al. | |
| 5,868,638 A | * | 2/1999 | Inoue et al. | 474/110 |
| 6,743,130 B2 | * | 6/2004 | Konno et al. | 474/111 |

FOREIGN PATENT DOCUMENTS

| | | | |
|---|---|---|---|
| DE | 25 25 352 | A | 12/1976 |
| DE | 256350 | Y | 5/1988 |
| DE | 42 12 309 | A | 10/1992 |
| DE | 196 09 583 | A | 9/1996 |
| DE | 195 42 861 | A | 5/1997 |
| DE | 198 30 855 | A | 2/1999 |
| DE | 696 09 303 | A | 11/2000 |
| DE | 102 30 739 | Y | 1/2004 |
| JP | 07 167 264 | | 7/1995 |
| JP | 08 233041 | A | 9/1996 |
| JP | 08 303541 | Y | 11/1996 |
| JP | 11 190398 | Y | 7/1999 |
| JP | 2001 349400 | Y | 12/2001 |
| JP | 2002 266957 | A | 9/2002 |
| JP | 2003 214504 | A | 7/2003 |
| JP | 2003 329092 | A | 11/2003 |

* cited by examiner

*Primary Examiner* — William A Rivera
(74) *Attorney, Agent, or Firm* — Lucas & Mercanti, LLP

(57) ABSTRACT

The invention relates to a rail (16a) of a flexible drive, which rail (16a) is intended to guide a drawing means (2). A lubricant which is introduced into the rail (16a) via the lubricant channel (13) brings about a pressure gap (15) which is formed between the inner side of the drawing means (2) and a guide face (9) of the rail (16a). Direct contact of the drawing means with the rail (16a) is suppressed on account of the lubricant which is introduced into the pressure gap (15), which has a friction-reducing effect.

21 Claims, 4 Drawing Sheets

OIL SUPPLY SYSTEM FOR SUPPLYING OIL TO SLIDE RAILS AND GUIDE RAILS

FIELD OF THE INVENTION

The present invention relates to a rail for a flexible drive which is configured as a tensioning rail or a guide rail and is provided for contact on a drawing means. Tensioning or guide rails of this type are used, in particular, in order to tension a chain or a belt in flexible drives. In order to achieve improved guidance of the drawing means on that contact face of the rail which is provided for this purpose, the said contact face is delimited laterally by rims.

BACKGROUND OF THE INVENTION

Rails of the above-described design type find a wide variety of applications, in particular in flexible drives of internal combustion engines. Rails of this type are used for force-transmitting or torque-transmitting drawing means, in order constantly to ensure a prestress which is sufficient for the functioning of the flexible drive. Rails of this type are usually arranged pivotably on a pin which is positioned in a stationary manner, in order to form a rotational bearing. A tensioning element, for example a compression spring or a hydraulically working apparatus, is assigned to the rail offset with respect to the rotational bearing. The hydraulically acting apparatus comprises a piston which, loaded by a hydraulic fluid pressure medium, exerts a force on the rail, in order thus to increase the tensioning of the drawing means. At the same time, the hydraulic tensioning apparatus includes a device which acts as pressure-limiting means and prevents a defined pressure being exceeded.

DE 42 12 309 A1 discloses a rail, with which a drawing means of a flexible drive is prestressed. The construction comprises a carrier element which is called an arm part and is connected to a shoe which performs the function of a sliding element. In the operating state, the rail is supported directly on the drawing means via the shoe. The shoe which is connected directly to the drawing means is manufactured from plastic. On account of the rail which is supported with a force-transmitting connection on the drawing means via the shoe, the said rail is subjected to wear independently of the lubricant conditions. For wear compensation, the rail is tracked via a spring means, a reduced prestressing force being set as the wear increases, with which prestressing force the rail bears against the drawing means. This can result in a critical wear state of the rail and the sliding element which is connected to it, as soon as the prestressing force which is set undershoots the prestressing force which is required for the functioning of the flexible drive. The reduced prestressing force at the same time leads to increased slip of the belt. In chain drives, an insufficient prestressing force of the tensioning system can lead to chain jumping between a chain sprocket and the chain, which causes consequential damage in timing drives, a flexible drive which is intended to drive a camshaft.

SUMMARY OF THE INVENTION

The present invention is based on the object of providing a rail for a flexible drive, with which reduced friction can be realized between the drawing means and the rail.

The solution of this set problem is brought about by the features of claim 1. According to the latter, the tensioning rail or guide rail according to the invention forms, in the operating state, a U-shaped receptacle which is wetted by a lubricant, as a result of which the drawing means is guided on a lubricant film, as far as possible in a contactless manner with respect to the rail. Here, the lubricant is guided in such a way that a pressure gap which is formed by the lubricant is formed between the drawing means and the guide face of the rail. In addition, the dimensions of the rail are adapted to the width of the drawing means in such a way that a defined gap width in the form of a leakage gap which is filled with the lubricant is formed in each case on both sides between the drawing means and the rim of the rail. The lateral leakage gap between the rims of the rail and the drawing means, in conjunction with a pressure gap which is formed between the guide face and the inner side of the drawing means, brings about the formation of a formed body in the region of the U-shaped receptacle, which formed body is similar to a pressure chamber.

The U-shaped receptacle and therefore the pressure chamber advantageously extend over the entire length of the rail, as a result of which the drawing means floats hydrodynamically, without radial and axial contact with the rail. This produces almost frictionless guidance of the drawing means in the region of the rail, which has an advantageous effect firstly on the wear and secondly on the service life of the drawing means. Moreover, an improved degree of efficiency is therefore produced for an internal combustion engine which is equipped with a friction-reducing flexible drive of this type.

Further advantageous refinements of the invention are the subject matter of dependent claims 2 to 21.

According to one preferred refinement of the invention, the lubricant is fed in a zone of the U-shaped receptacle, which zone is delimited radially by the guide face of the rail and the drawing means. The pressure of the lubricant can advantageously be used to have a direct influence on the pressure gap, that is to say the level of the pressure gap which is formed, which pressure gap has a direct influence on the prestressing of the drawing means. The guide rail according to the invention, with which at the same time the prestress of the drawing means which is configured as a belt can be influenced, advantageously does not require a further, separate tensioning system. This additionally produces a cost advantage of the rail according to the invention.

A further refinement of the invention includes a structured guide face of the rail. The structure of the rail makes intended improved oil adhesion to the guide face possible, in association with a reduced coefficient of friction between the drawing means and the rail.

Furthermore, the invention includes providing the guide face of the rail with a macrostructure which is of similar design to the surface of golf balls. A macrostructure which is applied to the guide face in an overlapping manner may preferably be suitable for this purpose, in order to improve the lubricant adhesion, in association with a reduced coefficient of friction between the drawing means and the rail.

As an alternative or in addition, the invention includes providing the drawing means with a macrostructure, preferably on the inside, that is to say on the side facing the rail. Lubricant is constantly conveyed into the contact zone between the rail and the drawing means via the macrostructure of the drawing means, in association with a desired reduction in the coefficient of friction.

Lubricating oil of the internal combustion engine which can be fed in via the pressure circulating lubrication system is preferably used as lubricant for the rail and the drawing means. For this purpose, it may be suitable to introduce the lubricant into the U-shaped receptacle offset from the end face of the rail, with consideration of the rotational direction of the drawing means.

As a measure for introducing the lubricant uniformly between the rail and the inner side of the drawing means which is configured as a belt, the guide face of the rail is provided with at least one lubricant channel or one lubricant groove. Here, the lubricant groove or the lubricant channel extends almost over the entire length of the rail, a groove-free spacing being maintained in each case with respect to the end sides, in order that the pressurized lubricant cannot escape from the pressure-chamber-like formed body in a pressure-less manner.

As an alternative to a lubricant feed means of the rail which is connected to the pressure circulating lubrication system of the internal combustion engine, the invention can be transferred, furthermore, to rails, in which the lubricant is supplied via spray nozzles. For this purpose, the rail is provided with what is known as a lubricant collector, an inlet with a wide surface area to the lubricant groove or the lubricant channel, which inlet represents a widened portion of the lubricant channel or lubricant groove which is made in the guide face. In the operating state, the lubricant nozzle is oriented in such a way that it introduces the lubricant in a targeted manner into the collector of the rail which is provided for this purpose. In the operating state, the lubricant is guided further continuously by a lubricant wedge which is formed between the rail and the drawing means into the constricting gap in the region of the rail, as a result of which the drawing means likewise floats hydrodynamically with respect to the rail.

A further advantageous refinement of the invention provides for one or more longitudinal grooves to be introduced into the guide face of the rail, in conjunction with transverse grooves, via which the lubricant can be distributed over a wide surface area. Here, the number and design of grooves is preferably determined by tests, in order to achieve an optimum between the lubricant amount which is introduced on one side and the resultant pressure build-up between the rail and the drawing means on the other side.

Moreover, effective lubricant supply can take place via a rotational bearing of the rail, which rotational bearing is assigned to one rail end, about which the rail can pivot. From the rotational bearing which is preferably connected to the pressure circulating lubrication system of the internal combustion engine, the lubricant passes, for example, via at least one lubricant bore or one lubricant channel to the guide face, the U-shaped receptacle of the rail. In a manner which improves the distribution of the lubricant, the lubricant bore preferably opens into a lubricant groove of the guide face.

A further design feature of the invention relates to the rims, on which the drawing means is guided laterally. The advantageous hydrodynamic floating according to the invention of the drawing means in the region of the rail of U-shaped design is determined directly by the gap width which is formed in each case on both sides of the drawing means and the rims of the rail. A lubricant amount is constantly guided away in the operating state, in association with a pressure drop, via the gap width which is also to be called leakage gap. This pressure drop can be influenced via the height of the rail rims and the size of the gap width. The rim height is advantageously adapted to a tooth base height of the drawing means which is configured as a belt. A rim height of this type avoids drawing-means contact in the region of the profiling or the toothing system with the rim of the rail, which reduces the wear and the friction.

The invention makes it possible to use a single-part rail, for example rails which can be manufactured inexpensively from cast aluminium. The measures according to the invention bring about considerably reduced friction between the contact partners, the rail and the drawing means, as a result of which a single-part rail which is manufactured from one material can be used.

As an alternative to this, the invention can likewise be transferred to rails of conventional construction, for example to rails having a basic body which is manufactured from aluminium and to which a sliding body made from plastic is fastened in a form-fitting manner. For this purpose, the guide face of the sliding body is provided with at least one lubricant channel or at least one lubricant groove, in accordance with the abovementioned refinements and effects.

The effectiveness of the rail according to the invention requires dimensions to be complied with, which have been determined empirically by tests. A value "s" of $\leqq 0.3$ mm is provided as gap width or as dimension for the leakage gap which results on both sides of the drawing means with respect to the rims of the rail. The interaction of the drawing means in conjunction with the rail which is designed according to the invention results in a pressure gap "h" which is formed between the guide face of the rail and the drawing means and, according to the invention, is $\geqq 0.1$ mm.

Furthermore, there is provision according to the invention for the rims of the rail to be configured in each case at the ends in such a way that they form in each case one region which is spread outwards in opposite directions. Even in the case of a rail which is not oriented in an optimum manner with respect to the drawing means, this measure makes it possible to guide the drawing means in the rail in a manner which is permanent, non-destructive and which at the same time reduces friction. Moreover, at both ends, or at least in the intake region of the drawing means, the guide face of the rail is provided with a region which is rounded in a more pronounced manner in a deviation from the drawing-means guide and likewise has the effect of reducing friction.

BRIEF DESCRIPTION OF THE DRAWINGS

The invention will be explained in greater detail using six drawings, in which.

DETAILED DESCRIPTION OF THE DRAWINGS

Figure 6:
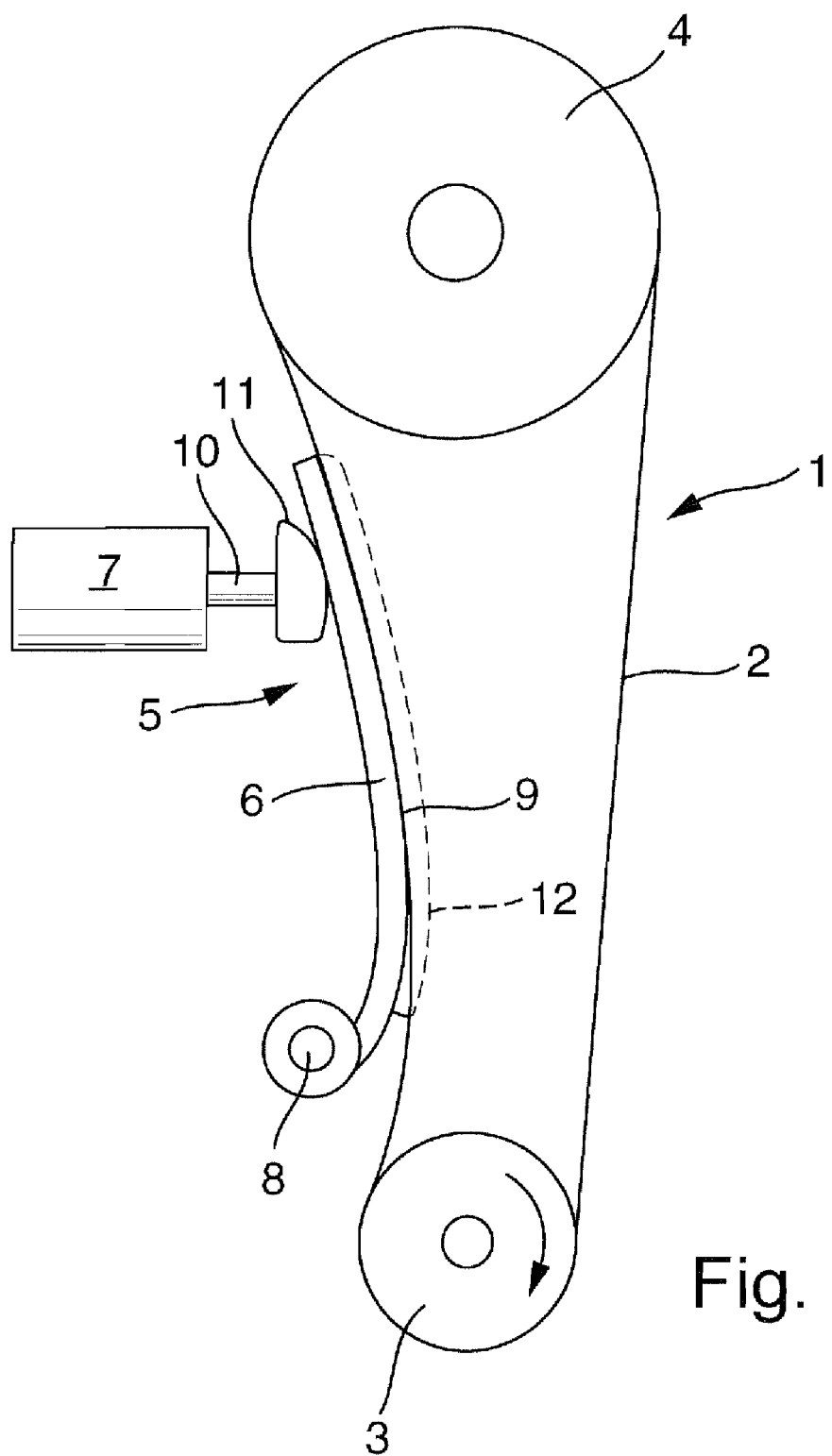
FIG. 6 shows the construction of a known flexible drive in conjunction with a rail, by way of which the drawing means is prestressed.

In order to explain the invention in greater detail, reference is made first of all to FIG. 6 which illustrates a known flexible drive 1. The flexible drive 1 comprises a drawing means 2, for example a belt, which connects the output member 3 to the drive member 4. The flexible drive 1 which circulates in the clockwise direction is assigned a tensioning system 5 on the empty run, which tensioning system 5 comprises a rail 6 and a spring means 7. The rail 6 which can be pivoted about a rotational bearing 8 is supported directly on the drawing means 2 by way of a guide face 9 of arched design. At the end which lies opposite the rotational bearing 8, the rail 6 is connected to the spring means 7 which continuously transmits a prestressing force onto the rail 6 and therefore prestresses the drawing means 2. For this purpose, for example, a tappet 10 which is force-loaded by a compression spring is provided as spring means 7, which tappet 10 is supported directly on the rail 6 by means of a convex end face 11. For improved guidance of the drawing means 2 on the rail 6, the latter has rims 12 which are offset axially with respect to one another and between which the drawing means 2 is guided.

Figure 1:
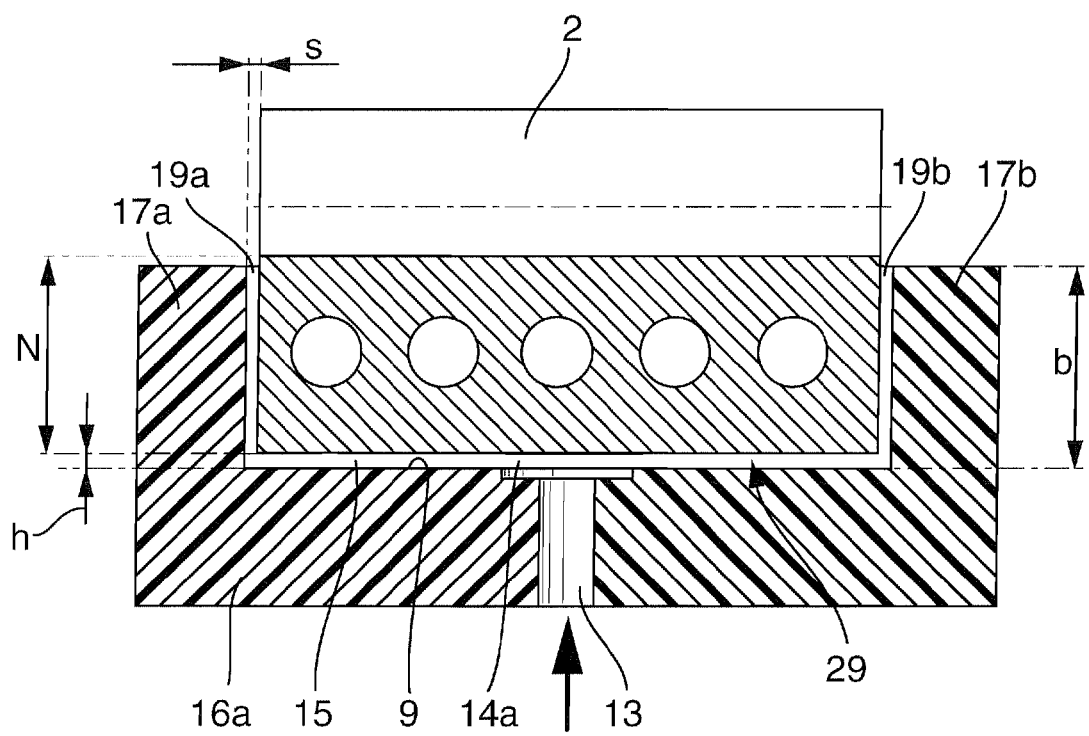
FIG. 1 shows a sectional view of the construction of the rail according to the invention, in conjunction with a drawing means.

FIG. 1 shows the construction of a rail 16a according to the invention, in conjunction with the drawing means 2. In the operating state, the rail 16a according to the invention avoids direct contact of the drawing means 2 with the guide face 9. For this purpose, a lubricant, in particular a lubricating oil of the internal combustion engine, is introduced into the U-shaped receptacle 29 by means of a pressure circulating lubrication system via a lubricant channel 13 which is formed centrally in the rail 6. From the lubricant channel 13, the lubricant enters a lubricant groove 14a, before the lubricant passes over a wide surface area into a pressure gap 15 which extends over the entire width of the drawing means 2 and is delimited on both sides by the rims 17a, 17b. The pressure of the lubricant causes the drawing means 2 to float with respect to the guide face 9. The pressure gap 15, characterized by the amount "h", decisively reduces the friction between the drawing means 2 and the rail 16a. Furthermore, in order to influence lubricant exit from the pressure gap 15, a leakage gap 19a, 19b is provided between the rims 17a, 17b and the side faces 18a, 18b of the drawing means 2. The leakage-gap width or the gap width "s" is chosen in such a way that firstly unimpeded rapid lubricant exit from the pressure gap 15 is suppressed and secondly friction is stopped between the rims 17a, 17b and the side faces 18a, 18b of the drawing means. In addition to an adaptation of the leakage gap 19a, 19b, furthermore, the rail 16a is configured in such a way that a rim height "b" of the rims 17a, 17b does not exceed a tooth base height "z" of the drawing means 2. In the operating state, the U-shaped receptacle 29 of the rail 16a, in conjunction with the drawing means 2, delimit a pressure space which is filled with lubricant.

Figure 2:
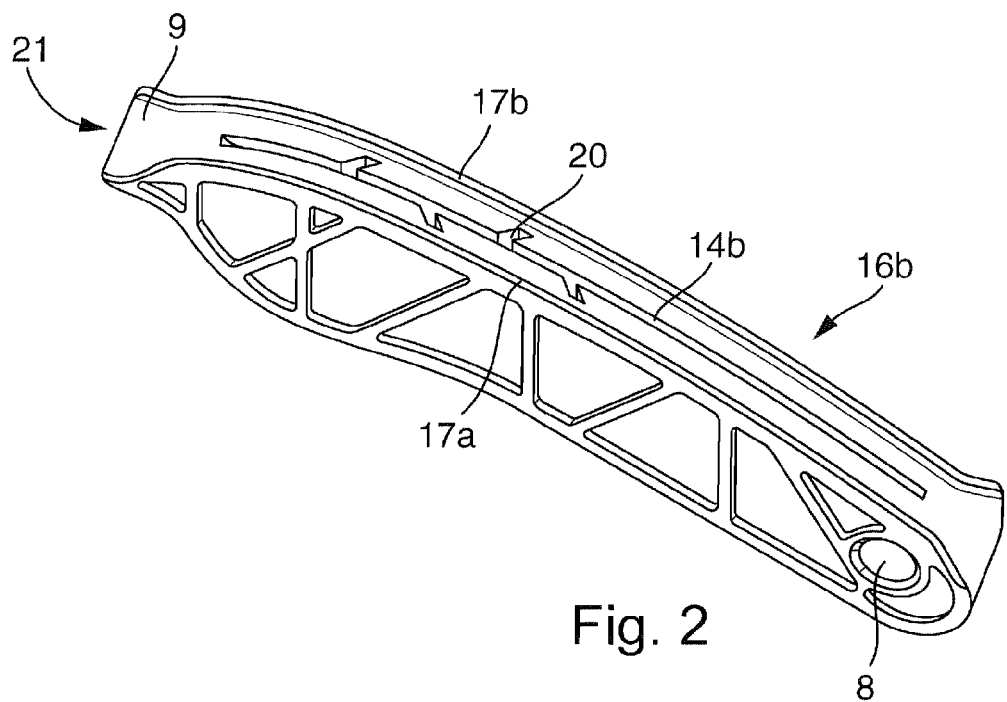
FIG. 2 shows the rail according to the invention as an individual part, in perspective.

FIG. 2 shows the rail 16b according to the invention, in perspective. The guide face 9 is provided with a central lubricant groove 16b which extends almost over the entire length of the rail 16b and starting from which offset transverse grooves 20 of oblique configuration adjoin. The transverse grooves 20 have the object of distributing the pressurized lubricant from the lubricant groove 14b over a wide surface area onto the guide face 9, in order to produce a desired pressure gap 15. At both ends, that is to say both at the end which faces the rotational bearing 8 and also in an inlet zone 21 of the drawing means 2 on the rail 16b, the rims 17a, 17b are spread outwards in each case in opposite directions with respect to one another. This measure brings about improved drawing-means guidance and makes tolerance compensation possible if, in the operating state, for example, the rail 16b is not oriented at the correct angle with respect to the profile of the drawing means 2.

Figure 3:
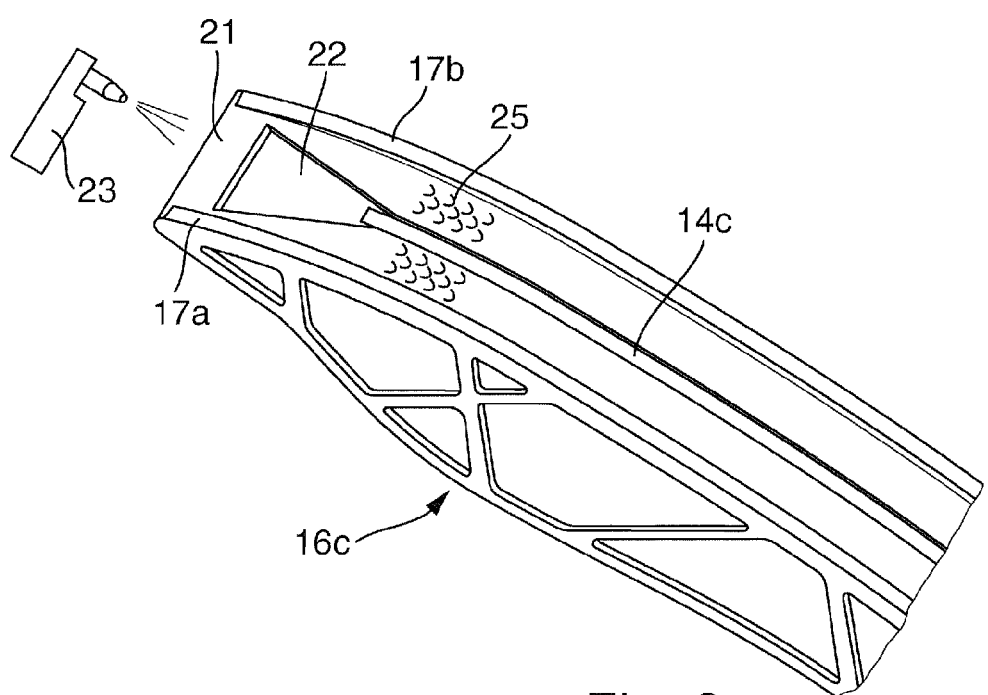
FIG. 3 shows a detail of the rail which is shown in FIG. 2, on an enlarged scale and having a lubricant collector.
Figure 4:
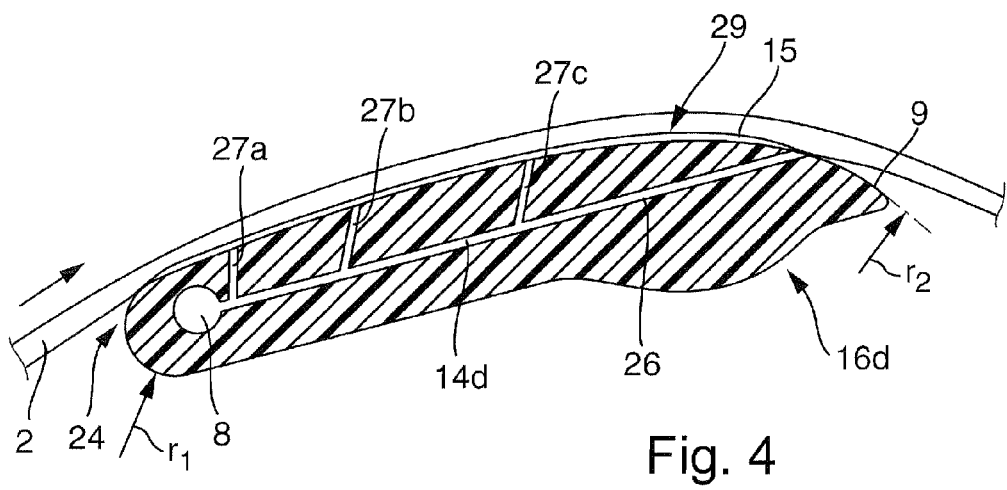
FIG. 4 shows a longitudinal section through a rail according to the invention which is supported on the drawing means.

The rail 16c according to FIG. 3 is provided with a lubricant groove 14c which forms a lubricant collector 22 on the end side, at the end which is directed towards the inlet zone 21. The lubricant collector 22 which forms a triangular contour in a plan view extends as far as possible over the entire width which is formed between the rims 17a, 17b, which lubricant collector 22 subsequently tapers to the width of the lubricant groove 14c. The lubricant collector 22 interacts with an external spray nozzle 23, starting from which lubricant is injected into the lubricant collector 22 in a targeted manner. The lubricant is therefore introduced over a wide surface area into a lubricant entry 24 which, as shown in FIG. 4, is formed between the rail 16c and the drawing means. Furthermore, the guide face 9 according to FIG. 3 is provided with a macrostructure 25 of overlapping design which brings about improved lubricant adhesion, which has an advantageous effect on the formation of the pressure gap 15.

The rail 16d which is depicted in longitudinal section according to FIG. 4 makes the profile clear of the lubricant channels 14d, in particular. The starting point of the lubricant channels 14d is the rotational bearing 8 of the rail 16d, which rotational bearing 8 is fed lubricant of the pressure circulating lubrication system of the internal combustion engine for lubrication purposes. From there, the lubricant is conveyed further in the U-shaped receptacle 29 in order to build up the pressure gap 15. The lubricant channels 14d comprise a longitudinal bore 26 which, starting from the rotational bearing 8, extends almost over the entire length of the rail 16d and opens at the end into the guide face 9. Here, branch bores 27a to 27c connect the longitudinal bore 26 to the guide face 9, in each case in a manner which is spaced apart from one another. In order to avoid a sharp-edged transition between the drawing means 2 and the rail 16d, the latter has radii "$r_1$" and "$r_2$" on both end sides, which radii are smaller than the associated radii of the drawing means 2.

Figure 5:
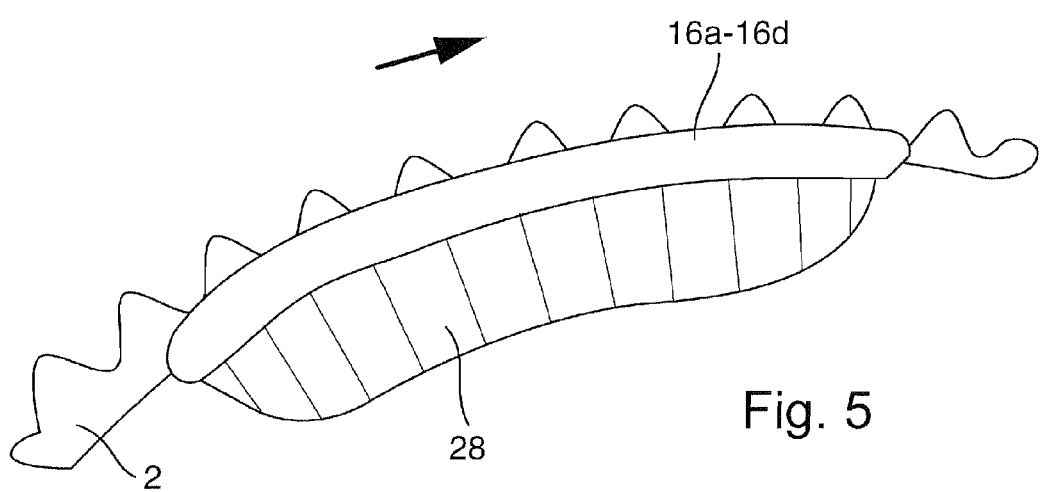
FIG. 5 shows an outline sketch which illustrates a pressure build-up of the lubricant in the region of the rail, on the inner side of the drawing means.

In order to underline the efficiency of the rail 16a to 16d according to the invention, FIG. 5 shows a generated pressure profile 28 of the U-shaped receptacle 29 of the rails 16a to 16d according to the invention, which pressure profile 28 is formed over the length of the end face 11. Accordingly, in the region of the inlet zone 21 of the drawing means 2, the greatest pressure is formed on the inside of the drawing means 2, which pressure slowly dissipates over the length of the end face 11, without being completely eliminated, and the drawing means 2 bears against the guide face 9.

LIST OF REFERENCE NUMERALS

1 Flexible drive
2 Drawing means
3 Drive member
4 Output member
5 Tensioning system
6 Rail
7 Spring means
8 Rotational bearing
9 Guide face
10 Tappet
11 End face
12 Rim
13 Lubricant channel
14a Lubricant groove
14b Lubricant groove
14c Lubricant groove
15 Pressure gap
16a Rail
16b Rail
16c Rail
16d Rail
17a Rim
17b Rim
18a Side face
18b Side face
19a Leakage gap
19b Leakage gap
20 Transverse groove 21 Inlet zone
22 Lubricant collector
23 Spray nozzle
24 Lubricant entry
25 Macrostructure
26 Longitudinal bore
27a Branch bore
27b Branch bore
27c Branch bore
28 Pressure profile
29 Receptacle

The invention claimed is:

1. A tensioning system, comprising:
a rail having a U-shaped receptacle, the U-shaped receptacle having a guide face which is delimited by a first lateral rim and a second lateral rim, the first lateral rim having an entirely linear inner face and the second lateral rim having an entirely linear inner face;
a drawings means; and
a lubricant wetting the guide face, the inner face of the first lateral rim and the inner face of the second lateral rim,
wherein in an operating state, the drawing means is guided in a contactless manner via the lubricant in the U-shaped receptacle with a pressure gap being formed between the drawing means and the guide face, a leakage gap being formed between the inner face of the first lateral rim and the drawing means and a leakage gap being formed between the inner face of the second lateral rim and the drawing means.

2. The tensioning system according to claim 1, wherein the lubricant is fed via a lubricant inlet in a zone of the U-shaped receptacle, which zone is delimited radially by the guide face of the rail and the drawing means.

3. The tensioning system according to claim 2, wherein the lubricant is introduced into the U-shaped receptacle offset towards one end of the rail.

4. The tensioning system according to claim 1, wherein at least one part region of the U-shaped receptacle has a structured surface.

5. The tensioning system according to claim 4, wherein the surface of the guide face is configured at least in regions as a macrostructure.

6. The tensioning system according to claim 5, wherein said rail has a macrostructure of overlapping design.

7. The tensioning system according to claim 6, wherein the lubricant groove is configured as a lubricant collector on the end which is oriented towards the lubricant inlet.

8. The tensioning system according to claim 1, wherein said rail interacts with a drawing means which has a macrostructure on at least one side which interacts with the rail.

9. The tensioning system according to claim 1, wherein the guide face of which encloses at least one lubricant groove.

10. The tensioning system according to claim 1, wherein the lubricant groove of the guide face extending as far as possible over the entire length of the rail.

11. The tensioning system according to claim 9, wherein the guide face of which encloses at least one longitudinal groove or at least one transverse groove in addition to or as an alternative to the lubricant groove.

12. The tensioning system according to claim 1, wherein said rail is arranged such that the rail can pivot about a rotational bearing and which interacts with a spring means in a manner which is spaced apart from the rotational bearing the lubricant passing via the rotational bearing into at least one lubricant channel and being conducted from there via at least one branch bore into the lubricant groove and into the U-shaped receptacle.

13. The tensioning system according to claim 1, wherein the lubricant being fed via a spray nozzle which is positioned separately from the rail.

14. The tensioning system according to claim 1, wherein the first lateral rim and the second lateral rim each have a height which is $\leq$ a tooth base height of the drawing means which is configured as a belt.

15. The tensioning system recording to claim 1, wherein said rail comprises two components, a basic carrier which is arranged such that the basic carrier can pivot over the rotational bearing, and an associated sliding body which interacts with the drawing means.

16. The tensioning system according to claim 15, wherein the sliding body, which is manufactured from plastic, is fastened to the basic carrier which is manufactured from aluminum, in a form-fitting manner.

17. The tensioning system according to claim 1, wherein said rail is a single-piece construction of aluminum or plastic.

18. The tensioning system according to claim 1, wherein the leakage gap formed between the inner face of the first lateral rim and the drawing means and the inner face of the second lateral rim and the drawing means is $\leq 0.3$ mm.

19. The tensioning system according to claim 1, wherein the pressure gap formed between the guide face and the drawing means is $\leq 0.1$ mm.

20. The tensioning system according to claim 1, wherein the first lateral rim and the second lateral rim are each spread outward in opposite directions to one another at both ends of the rail.

21. The tensioning system according to claim 1, wherein the guide face has radii at both ends, which radii are smaller than a profile associated radii of the drawing means.

* * * * *